(12) United States Patent
Wang et al.

(10) Patent No.: US 12,020,043 B2
(45) Date of Patent: Jun. 25, 2024

(54) USING CONTAINERS TO CLEAN RUNTIME RESOURCES WHEN UNLOADING A SHARED LIBRARY

(71) Applicant: International Business Machines Corporation, Armonk, NY (US)

(72) Inventors: Heng Wang, Beijing (CN); Wan Yue Chen, Beijing (CN); Zhen Chen, Markham (CA); Wen Ji Huang, Beijing (CN); Xiao Ling Chen, Beijing (CN); Dong Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 17/481,580

(22) Filed: Sep. 22, 2021

(65) Prior Publication Data

US 2023/0092747 A1 Mar. 23, 2023

(51) Int. Cl.
*G06F 9/445* (2018.01)
*G06F 9/455* (2018.01)

(52) U.S. Cl.
CPC ...... *G06F 9/44521* (2013.01); *G06F 9/44563* (2013.01); *G06F 9/45558* (2013.01)

(58) Field of Classification Search
None
See application file for complete search history.

(56) References Cited

U.S. PATENT DOCUMENTS 10,445,112 B2 10/2019 Sirajuddin
2008/0270461 A1\* 10/2008 Gordon ................. G06F 3/0608

2014/0304719 A1\* 10/2014 Pope ...................... G06F 9/546
                                                                    719/328
2016/0364222 A1\* 12/2016 Schultz ............... G06F 9/44521
2017/0132345 A1    5/2017 Dumont et al.
2019/0243636 A1    8/2019 Sahu et al.
2021/0373979 A1\* 12/2021 Lewin .................... G06F 9/542
2023/0035594 A1\*  2/2023 Iyer .......................... G06F 9/52

FOREIGN PATENT DOCUMENTS

CN        108762825 B        4/2021
KR     20120014673 A    *   2/2012   ........... G06F 9/4494

OTHER PUBLICATIONS

Kim et al.; "Method for Dectecting Falsification of Process by Inserting Disguised DLL"; Feb. 20, 2012; English translation corresponding to KR 20120014673 A (Year: 2012).\*
Mattn, "runtime: support diclose with -buildmode=c-shared #11100," GitHub, https://github.com/golang/go/issues/11100 (Jun. 6, 2015) 2 pages.
Sreecha, "Clearly document the cases where fork() is supported in grpc() #14055," GitHub, https://github.com/grpc/grpc/issues/14055 (Jan. 18, 2018) 1 page.

\* cited by examiner

*Primary Examiner* — Umut Onat
(74) *Attorney, Agent, or Firm* — CANTOR COLBURN LLP; Teddi Maranzano

(57) ABSTRACT

Embodiments of the invention include a computer-implemented method that includes accessing, using a processor, a loader library; using the processor to generate a mock library comprising a mock version of the loader library; using the processor to containerize the loader library; and using the processor to unload the loader library.

9 Claims, 7 Drawing Sheets

USING CONTAINERS TO CLEAN RUNTIME RESOURCES WHEN UNLOADING A SHARED LIBRARY

BACKGROUND

The present invention relates generally to programmable computer systems. More specifically, the present invention relates to computer systems, computer-implemented methods, and computer program products that utilize containers to clean runtime resources when unloading a shared library, thereby avoiding segmentation errors.

Microservices are a type of software architecture where the functionality of a software application is broken up into smaller fragments to make the application more resilient and scalable. The smaller fragments are referred to as "services." Each service is modularized in that it focuses only on a single functionality of the application and is isolated from the others, making each one of them independent. Modularity allows development teams to work separately on the different services without requiring complex design-related orchestration between the teams.

The different microservices can communicate with each other through APIs or web services to execute the overall functionality of the application. For example, microservices can communicate with one another and with other software applications using a remote procedure call (RPC) protocol. RPC is a protocol that one program can use to request a service from a program located in another computer on a network without having to understand the network's details. RPC protocols use the client-server model. The requesting program is a client, and the service-providing program is the server.

Application programs utilize libraries to improve efficiency in both the development and execution of the application program. A library is a collection of non-volatile resources used by computer programs. Libraries are often used for software development. Libraries can include configuration data, documentation, help data, message templates, pre-written code, pre-written subroutines, and the like. Programmers who want to write a higher-level program can use a library to make system calls instead of implementing those system calls over and over again. Library code is organized in such a way that it can be used by multiple programs that have no connection to each other, while code that is part of a program is organized to be used only within that one program. A library is organized for the purposes of being reused by independent programs or sub-programs, and the user only needs to know the interface and not the internal details of the library. Libraries enable the reuse of standardized program elements. When a program invokes a library, it gains the behavior implemented inside that library without having to implement that behavior itself. Libraries encourage the sharing of code in a modular fashion and ease the distribution of the code.

The behavior implemented by a library can be connected to the invoking program at different program lifecycle phases. If the code of the library is accessed during the build of the invoking program, the library is called a static library. An alternative is to build the executable of the invoking program and distribute that independently of the library implementation. The library behavior is connected after the executable has been invoked to be executed, either as part of the process of starting the execution, or in the middle of execution. In this case the library is called a dynamic library (loaded at runtime). A dynamic library can be loaded and linked when preparing a program for execution by the linker. Alternatively, in the middle of execution, an application can explicitly request that a module be loaded.

SUMMARY

Embodiments of the invention include a computer-implemented method that includes accessing, using a processor, a loader library; using the processor to generate a mock library comprising a mock version of the loader library; using the processor to containerize the loader library; and using the processor to unload the loader library.

Embodiments of the invention also provide computer systems and computer program products for having substantially the same features as the computer-implemented method described above.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
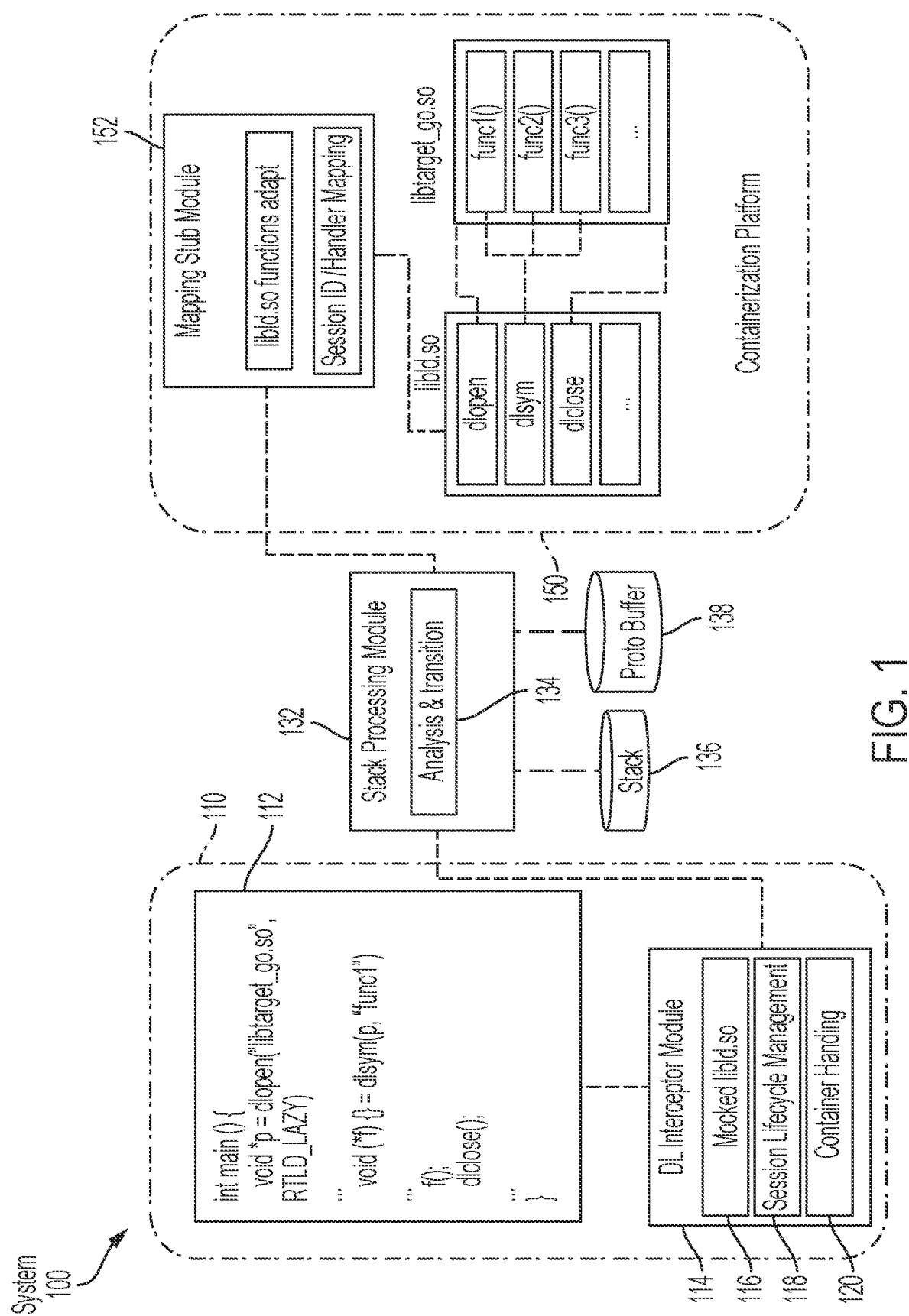
FIG. 1 depicts a block diagram illustrating a system embodying aspects of the invention.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the function units of the systems described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together but can include disparate instructions stored in different locations which, when joined logically together, function as the module and achieve the stated purpose for the module.

The various components, modules, sub-function, and the like of the systems illustrated herein are depicted separately for ease of illustration and explanation. In embodiments of the invention, the operations performed by the various components, modules, sub-functions, and the like can be distributed differently than shown without departing from the scope of the various embodiments of the invention describe herein unless it is specifically stated otherwise.

For convenience, some of the technical functions and/or operations described herein are conveyed using informal expressions. For example, a processor that has data stored in its cache memory can be described as the processor "knowing" the data. Similarly, a user sending a load-data command to a processor can be described as the user "telling" the processor to load data. It is understood that any such informal expressions in this detailed description should be read to cover, and a person skilled in the relevant art would understand such informal expressions to cover, the informal expression's corresponding more formal and technical description.

Turning now to an overview of technologies that are more specifically related to aspects of the invention, as previously noted herein, microservices are a type of software architecture where the functionality of a software application is broken up into smaller fragments to make the application more resilient and scalable. The smaller fragments are referred to as "services. Each service is modularized in that it focuses only on a single functionality of the application and is isolated from the others, making each one of them independent. Modularity allows development teams to work separately on the different services without requiring complex design-related orchestration between the teams.

The different microservices can communicate with each other through APIs or web services to execute the overall functionality of the application. For example, microservices can communicate with one another and with other software applications using a remote procedure call (RPC) protocol. RPC is a protocol that one program can use to request a service from a program located in another computer on a network without having to understand the network's details. RPC protocols use the client-server model. The requesting program is a client, and the service-providing program is the server.

Application programs utilize libraries to improve efficiency in both the development and execution of the application program. A library is a collection of non-volatile resources used by computer programs. Libraries are often used for software development. Libraries can include configuration data, documentation, help data, message templates, pre-written code, pre-written subroutines, and the like. Programmers who want to write a higher-level program can use a library to make system calls instead of implementing those system calls over and over again. Library code is organized in such a way that it can be used by multiple programs that have no connection to each other, while code that is part of a program is organized to be used only within that one program. A library is organized for the purposes of being reused by independent programs or sub-programs, and the user only needs to know the interface and not the internal details of the library. Libraries enable the reuse of standardized program elements. When a program invokes a library, it gains the behavior implemented inside that library without having to implement that behavior itself. Libraries encourage the sharing of code in a modular fashion and ease the distribution of the code.

The behavior implemented by a library can be connected to the invoking program at different program lifecycle phases. If the code of the library is accessed during the build of the invoking program, the library is called a static library. An alternative is to build the executable of the invoking program and distribute that independently of the library implementation. The library behavior is connected after the executable has been invoked to be executed, either as part of the process of starting the execution, or in the middle of execution. In this case the library is called a dynamic library (loaded at runtime). A dynamic library can be loaded and linked when preparing a program for execution by the linker. Alternatively, in the middle of execution, an application can explicitly request that a module be loaded.

Dynamic loading is a mechanism by which a computer program can, at run time, load a library (or other binary) into memory; retrieve the addresses of functions and variables contained in the library; execute those functions or access those variables; and unload the library from memory. gRPC (Google® remote procedure call) is a modern open source high performance RPC framework that can run in any environment. Several RPC frameworks (e.g., gRPC) don't support "cross-process invoke," and, accordingly, the gRPC library can't be unloaded. More specifically, in such RPC frameworks a segmentation fault happens when unloading a shared object.

Turning now to an overview of aspects of the invention, embodiments of the invention provide computer systems, computer-implemented methods, and computer program products that avoid the segmentation faults that occur when known RPC frameworks attempt to unload a shared library by utilizing containers to clean runtime resources when unloading the shared library. The innovative computer-implemented method in accordance with embodiments of the invention is provided to unload the shared library and clean up the running environment safely. Embodiments of the invention use a containerized libld.so (i.e., a containerized dynamic linker/loader) and a target shared library (i.e., the shared library to be unloaded) to make the language environment such that it can be destroyed safely when unloading the target shared library. A shared library always has a suffix ".so". The program instruction/function "libtarget_go.so" and "libld.so" are shared libraries. However, "libld.so" is a special shared library in that "libld.so" (or ld.so) is a dynamic linker/loader that provides dlopen( )/dlsym( )/dlcose( ) to load/unload other shared libraries.

A dynamic link (DL) interceptor module manages the container lifecycle, which includes creating/destroying a container, as well as delivering data and function requests from a host to a container. It also manages the session lifecycle, which includes creating/destroying a session, which is used to talk to the container when a dl functions come in. A stack processing module does the conversion between a stack and a protocol buffer. Protocol buffers are a language-neutral, platform-neutral, extensible mechanism for serializing structured data. A user defines how the data will be structured once, then special generated source code is used to easily write and read the structured data to and from a variety of data streams using a variety of languages. The DL interceptor module and a Mapping Stub Module use this function to convert then deliver data to each other. The Mapping Stub Module loads the target shared library to the memory address space by utilizing libdl.so in the container which was created by an LD Interceptor Module, then record the map between session ID and the handler. The data is then routed to the target library when a dl function comes in. When a dlclose request comes in, DL Interceptor Module destroys the container and invalidates the session ID. Accordingly, in embodiments of the invention, containerizing the shared library allows the shared library to be unloaded without generating a segmentation fault. Although a segmentation may happen inside the container, the whole container is destroyed when unloading in accordance with embodiments of the invention. Accordingly, using aspects of the invention, the end-user outside the container will never see the "segmentation fault" failure.

Turning now to a more detailed description of aspects of the invention, FIG. 1 depicts a system 100 in accordance with embodiments of the invention. Prior to describing the system 100, several open source concepts that are relevant to aspects of the invention are described. The programs libld.so and ld-linux.so find and load the shared objects (shared libraries) needed by a program, prepare the program to run, and then run it. Accordingly, the program "libld.so" is a dynamic linker/loader. It provides dlopen( )/dlsym( )/dlcose( ) to load/unload other shared libraries. Also, protocol buffers are a language-neutral, platform-neutral, extensible mechanism for serializing structured data. A user defines how the data will be structured once, then special generated source code is used to easily write and read the structured data to and from a variety of data streams using a variety of languages.

Referring again to FIG. 1, the system 100 includes an external entity 110 in communication with a containerization platform 150 through a stack processing module 134, configured and arranged as shown. The entity 110 includes a set of software instruction (or computer code) 112 and a dynamic link (DL) interceptor module 114. The software instructions 112 are configured to use a dlclose( ) instruction. More specifically, the software instructions 112 are a program/application, which loads a shared library. The program "libtarget_go.so" is an example name of a shared library. It can be any shared library. The program instructions dlopen( )/dlsym( )/dlclose( ) in the computer code 112 are three (3) functions that are provided by libld.so to load shared libraries. The computer code 112 demonstrates the process to load/unload the shared library libtarget_go.so by utilizing mocked dlopen( )/dlsym( )/dlclose( ) which are provided by mocked dynamic linker/loader (i.e., libld.so).

Without benefit of aspects of the invention, the computer code 112 would talk to or invoke "libld.so". However, "libld.so" is not able to clean up the whole environment when unloading the shared library. Sometimes "libld.so" causes errors, for example, "segmentation fault" errors, during unloading and impacts the computer code 112. In accordance with aspects of the invention, the DL Interceptor Module 114 introduces a new Mocked libld.so 116 so that the computer code 112 can talk to (or invoke) the Mocked libld.so 116 instead of the real "libld.so". The DL Interceptor Module 114 is configured to manage the container lifecycle, and also deliver data and function requests from the computer code 112 to the Containerization Platform 150. The DL Interceptor Module 114 also manages the session lifecycle. It unloads a shared library by destroying the container which has the shared library inside. Accordingly, the unexpected error inside the container will not impact the application/program which locates at the host. Mocked libld.so 116 is a mocked "libld.so". The Mocked libld.so 116 receives the requests from the computer code 112, and the requests will be handled and delivered to the real "libld.so". When an end-user invokes a dl-functions (i.e., dlopen/dlsym/dlclose), it actually invokes a mocked dl-functions inside the Mocked libdl.so 116.

The DL interceptor module 114 also includes a session lifecycle management module 118 and a container handling module 120, configured and arranged as shown. The Session Lifecycle Management module 118 creates a session structure for which one program/application corresponds to a unique session structure. The session structure includes a "session ID", which is a "targeted shared library name". When the customized container starts up, the "targeted shared library name" will be loaded by the dynamic linker/loader (libld.so) inside the container. For the container handling module 120, DL means "dynamic link," and the "dynamic link library" has the same meaning as a "shared library." Thus, "DL Name" is the dynamic link library name, which is the shared library name. Thus, the container handling module 120 provides functions to manage containers. For example, the module 120 provides Init( ) and Destroy( ) functions. Init (Session ID, DL Name) creates a container and passes the DL Name (the shared library name) to the container so that the dynamic linker/loader (libld.so) knows which shared library needs to be loaded inside the container. Destroy( ) destroys the created container.

The stacking processing module 132 includes an analysis & transition module 134, and the module 132 is communicatively coupled to a call stack 136 and a protocol (proto) buffer 138. In general, a call stack is a stack data structure that stores information about the active subroutines of a computer program. Although maintenance of the call stack is important for the proper functioning of most software, the details are normally hidden and automatic in high-level programming languages. Many computer instruction sets provide special instructions for manipulating stacks. A call stack is used for several related purposes, but the main reason for having one is to keep track of the point to which each active subroutine should return control when it finishes executing. An active subroutine is one that has been called, but is yet to complete execution, after which control should be handed back to the point of call. Such activations of subroutines may be nested to any level (recursive as a special case), hence the stack structure.

The analysis and transition module 134 of the module 132 takes on performance of the main work of the stack processing module 132. The parameters of computer code in a "stack" form are hard to transfer, but the parameters in a protocol buffer form are easy to transfer. Accordingly, the analysis and transition module 134 provides two (2) parameters operations methods, namely Pack( ) and UnPack( ) to do the conversion. The stack processing module 132 reads the parameters from the call stack 136 of the running computer code, then converts the parameters to the protocol buffer form (protocol buffer 138). It can also convert the parameters from the protocol buffer form, then write the parameters back to the call stack 136 of the computer code. As noted, through the analysis and transition module 134, the stack processing module 132 provides two (2) parameter operations methods, namely Pack( ) and UnPack( ). The Pack( ) method reads the parameters from the call stack 136 of the running computer code, then converts the parameters to the proton buffer form (protocol buffer 138). The UnPack( ) method converts the parameters from the protocol buffer form, then writes the parameters to the call stack 136 of the computer code.

The containerized platform 150 includes a mapping stub module 152, a libld.so set of commands/functions, and a libtarget_go.so set of commands/functions. In general, containerized platform 150 can be an open source containerized platform configured and arranged for building, deploying, and managing containerized applications. An open source containerization platform enables developers to package applications into containers-standardized executable components combining application source code with the operating system (OS) libraries and dependencies required to run that code in any environment. Containers simplify delivery of distributed applications, and have become increasingly popular as organizations shift to cloud-native development and hybrid multi-cloud environments. Open source containerized platforms are essentially toolkits that enable developers to build, deploy, run, update, and stop containers using simple commands and work-saving automation through a single API. Containers are made possible by process isolation and virtualization capabilities built into the Linux kernel. These capabilities—such as control groups (Cgroups) for allocating resources among processes, and namespaces for restricting a processes access or visibility into other resources or areas of the system—enable multiple application components to share the resources of a single instance of the host operating system in much the same way that a hypervisor enables multiple virtual machines (VMs) to share the CPU, memory and other resources of a single hardware server. As a result, container technology offers all the functionality and benefits of VMs—including application isolation, cost-effective scalability, and disposability.

Containerization platforms use so-called "images" that contain executable application source code as well as all the tools, libraries, and dependencies that the application code needs to run as a container. When an image is run, it becomes one instance (or multiple instances) of the container. It's possible to build an image from scratch, but most developers pull them down from common repositories. Multiple images can be created from a single base image, and they'll share the commonalities of their stack. Images are made up of layers, and each layer corresponds to a version of the image. Whenever a developer makes changes to the image, a new top layer is created, and this top layer replaces the previous top layer as the current version of the image. Previous layers are saved for rollbacks or to be re-used in other projects. Each time a container is created from an image, yet another new layer called the container layer is created. Changes made to the container-such as the addition or deletion of files—are saved to the container layer only and exist only while the container is running. This iterative image-creation process enables increased overall efficiency because multiple live container instances can run from just a single base image, and when they do so, they leverage a common stack. Containers are the live, running instances of images. While images are read-only files, containers are live, ephemeral, executable content. Users can interact with them, and administrators can adjust their settings and conditions using docker commands.

Referring more specifically to the containerization platform 150, the platform 150 is a container that contains the mapping stub module 152, dynamic linker/loader (i.e., libdl.so), and other shared libraries, like libtarget_go.so. When dlclose( ) is invoked by the computer code on the system 100, dlclose( ) utilizes the DL interceptor module 114 to destroy the whole container. Accordingly, all the things inside the container will be destroyed. Any failures (for example, a segmentation fault) that happens inside the container will not impact the language environment of the system 100.

The mapping stub module 152 loads the real libld.so to the memory address space of containerization platform 150. Then libld.so loads the libtarget_go.so to the memory address space of containerization platform 150. Then the map between the session ID and the handler is recorded. The data and dlsym( ) request are routed to the target library when a dl function comes in. The "libld.so function adapt" module receives the protocol buffer data from the host. The mapping stub module 152 keeps the map of a Session ID and Handler so that when a dlsym( ) request comes in, the mapping stub module" 152 knows the target place to which it should be routed.

The "libtarget.go.so" is a shared library which contains a serial of functions like "func1( )", "func2 ( )", and "func3 ( )". FIG. 1 illustrates how the "func1" request will be handled in system 100. When the computer code 112 wants to call "func1( )" in "libtarget_go.so", it utilizes the mocked dlopen( ) in the DL interceptor module 114 to create the containerization platform 150. It utilizes the mocked dlsym(p, "func1") to send the request to the containerization platform 150. It utilizes the mocked dlclose( ) to destroy the containerization platform 150.

Figure 2:
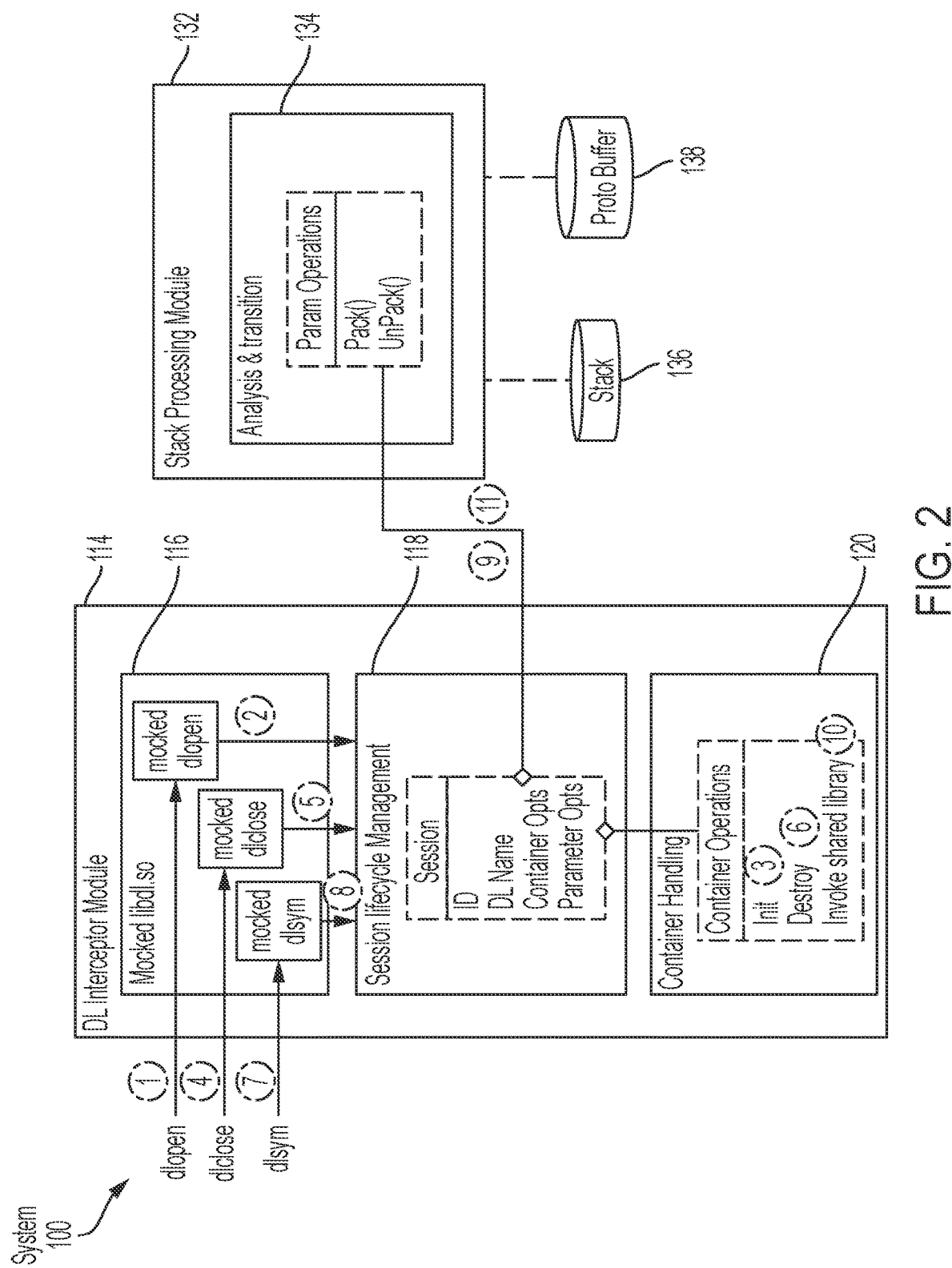
FIG. 2 depicts a block diagram illustrating a system embodying aspects of the invention.
Figure 3:
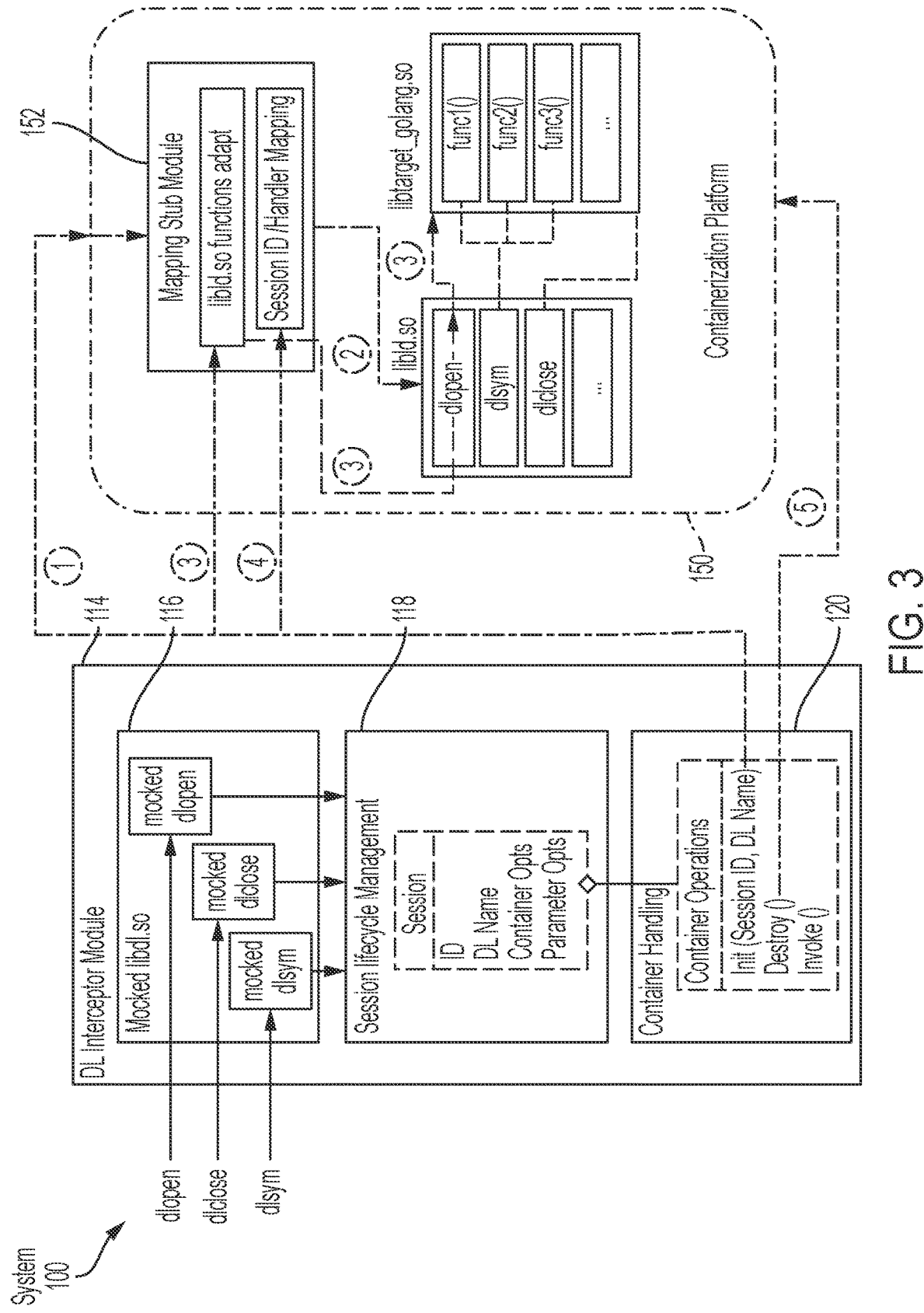
FIG. 3 depicts a block diagram illustrating a system embodying aspects of the invention.
Figure 4:
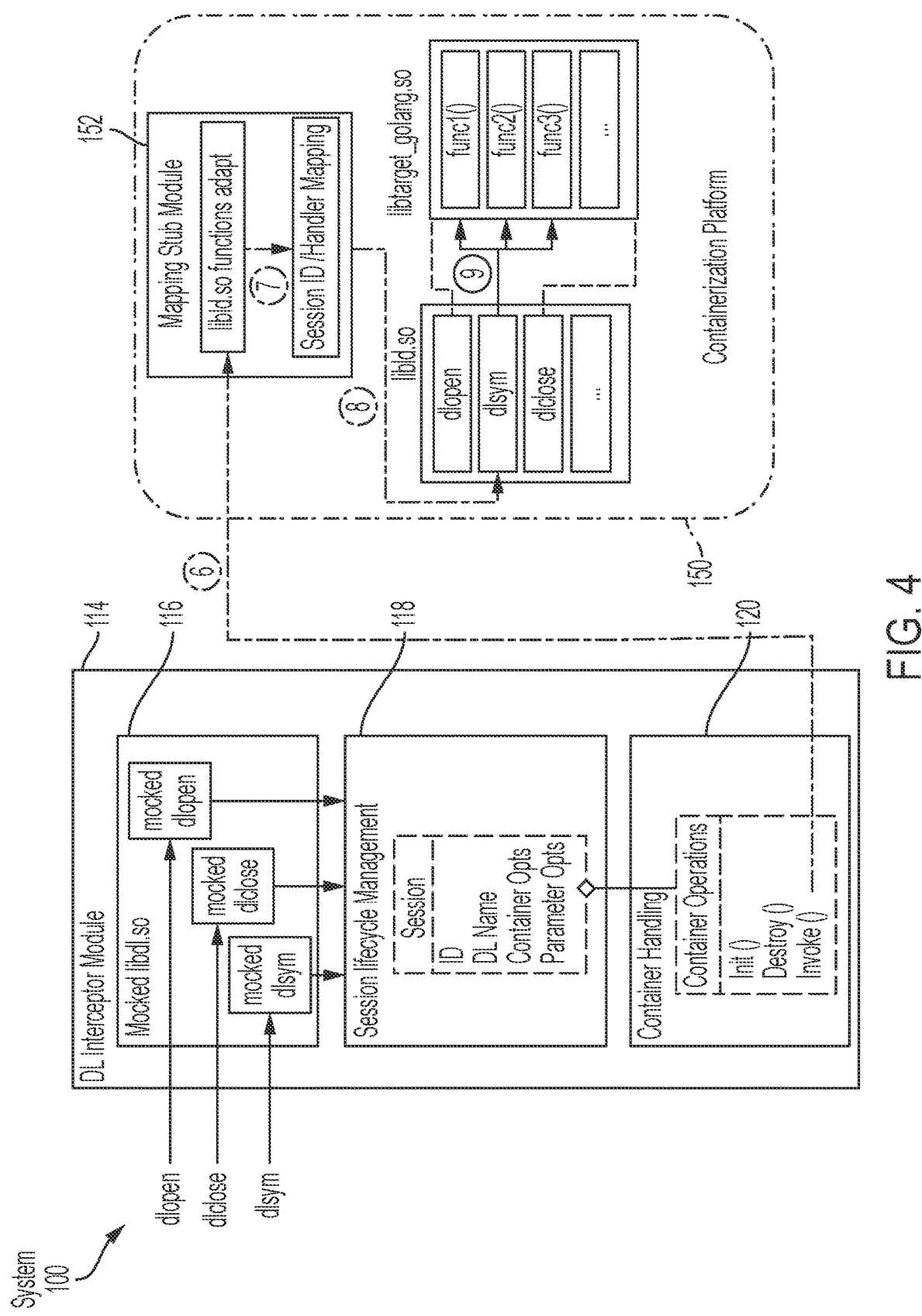
FIG. 4 depicts a block diagram illustrating a system embodying aspects of the invention.

The operation of the system 100 is depicted in FIGS. 2, 3, and 4 and will be described with reference to the various operation steps shown in each FIGS. 2, 3, and 4. FIGS. 2 and 3 provide additional details of some of the components of the system 100 shown in FIG. 1, so these additional details will be introduced before describing the methodologies shown in FIGS. 2, 3, and 4. As shown in FIG. 2, inside the Mocked libld.so 116, includes "mocked dlsym", "mocked dlclose", and "mocked dlopen". The existing "libld.so" contains "dlsym( )", "dlclose( )", "dlopen( )". By using the methodologies depicted in FIGS. 2-4, when the computer code 112 invokes "dlsym( )", "dlclose( )", "dlopen( )", it actually invokes the "mocked dlsym", "mocked dlclose", and "mocked dlopen" in the mocked libld.so 116. The mocked libld.so 116 routes the function requests to the real libld.so inside the containerization platform 150.

As shown in FIG. 2, inside the session lifecycle management 118 are the "Session", "ID", "DL Name", "Container Opts", and "Parameter Opts". When a computer code invokes a dlopen function, it actually invoked a mocked dlopen inside libdl.so shared library. The Mocked dlopen talks to the session lifecycle management module 118. The session lifecycle management module 118 creates a session structure. Each computer code 112 creates a unique session structure, which contains a unique session ID. "Session ID" is session identity. "DL Name" is the dynamic link library name, which is the shared library name. "Container Opts" contains operations to Init( ) Destroy( ), and Invoke( ) functions. Init( ) initializes a container. Destroy( ) destroys a container. Invoke( ) invokes the real functions (function 1,2,3) in libtarget_go.so inside the container. "Parameter Opts" refers to the Pack( ) and the UnPack( ) methods. The Pack( ) method reads the parameters from the call stack 136 of the running computer code 112, then converts the parameter to the "Protocol Buffer" form. The Unpack( ) method converts the parameter from the "Protocol Buffer" form, then writes the parameters to the call stack 136 of the computer code 112.

As shown in FIG. 2, inside the container handling module 120 are "Container Operations", "Init", "Destroy", and "Invoke shared library". Container handling module 120 provides these operations to initialize the containerization platform 150, destroy the containerization platform 150 and deliver the dlsym( ) request to the containerization platform 150.

As shown in FIG. 2, inside the box labeled analysis & transition 134 are "Param Operations", "Pack ( )", and "UnPack( )"? "Parameter Opts" refers to the Pack( ) and UnPack( ) methods. It aims to pack the data for transformation and unpack the data when it arrives.

As shown in FIG. 3, inside the containerization platform 150 are "libtarget_golang.so". The "libtarget_go.so" is an example name of a shared library. It can be any name. Embodiments of the invention focus on unloading the shared library "libtarget_go.so" entirely without any pollution to the original language environment.

Referring now to the methodologies shown in FIGS. 2-4, in FIG. 2, for the dlopen, in S1, when the end user invokes a dlopen function, it actually invokes a "mocked" dlopen inside libdl.so shared library. In S2, mocked dlopen talks to the session lifecycle management module 118. The session lifecycle management module 118 creates a session structure which contains a new UUID as the session ID; a new DL Name, the target shared library to be loaded; register container operations which is provided by the container handling module 120; and register parameter operations which are provided by the stack processing module 132. In S3, the mocked dlopen utilizes the init( ) method to create a new container.

For dlclose, in S4, when the end user invokes a dlclose function, it actually invokes a mocked dlclose inside the libdl.so shared library. In S5, mocked dlclose invalidates the session ID in session structure. In S6, mocked dlclose utilizes the destroy( ) method to destroy the container and free the session structure.

For dlsym, in S7, when the end user invokes a dlsym function, it actually invokes a mocked dlsym inside libdl.so shared library. In S8, mocked dlsym talks to the session lifecycle management module 118. In S9, the session lifecycle management module 118 utilizes the pack( ) method which was registered by the stack processing module 132 in S2 to convert the parameters from stack 136 to protocol buffer 138. In S10, the mocked dlsym utilizes the invoke( ) method which was registered by container handling module 120 in S2 to do the call with protocol buffer 138 in the last step. In S11, mocked dlsym retrieves the result and parameters, then utilizes the unpack( ) method to convert them from protocol buffer 138 to stack 136.

FIGS. 3 and 4 depict additional operations S1-S8. The S1-S8 designations in FIGS. 3 and 4 are used for convenience, and it is noted that S1-S8 shown in FIGS. 3 and 4 are different from S1-S8 shown in FIG. 2. As shown in FIG. 3, in S1 the init( ) method creates a container and uses the host image as the base image. The system directory, especially the library directory, is mapped on the host to the container, and the mapping stub module 152 is initialized. The mapping stub module 152 loads libld.so to an address space. In S2, the protocol buffer data is passed to the container, which includes session ID, target library name, and function name. Dlopen( ) is used in libld.so to load the target library to the address space. Dlopen( ) return a handler, and the handler will be used by dlsym( ) and dlclose( ). In S4, the session ID is mapped to the handler generated in last step. In S5, the destroy( ) method destroys the container, which was created in S1.

As shown in FIG. 4, in S6, the invoke( ) method passes the protocol buffer data to the mapping stub module 152, which includes session ID; function name; and function parameters. In S7, the mapping stub module 152 gets the handler by the session ID. In S8, the mapping stub module 152 calls the target function by utilizing libld.so with the handler, the function name, and the function parameters. In S9, libld.so calls the real function.

Accordingly, it can be seen that embodiments of the invention provide technical benefits and effects. Embodiments of the invention can clean up all the resources of shared library when unloading the shared library. The changes are transparent to the end user, and code changes are required to be made by the end user. Embodiments of the invention do not have a shared library or programming language limitation. The mocked library (mocked libld.so) container is outside the container. The libld.so is inside the container, and the mocked libld.so delivers the request to libld.so inside the container. The libld.so is loader library, and the mocked libld.so is a mocked loader library.

Accordingly, embodiments of the invention provide a novel computer-implemented method configured to unload the shared library and clean up the language environment safely with a DL interceptor, stack processing, and a containerized target shared library. The DL interceptor module manages the shared library session lifecycle and container lifecycle, which creates the container when a dlopen request comes in, and destroys the container when a dlclose request comes in. The data and functions request are transmitted from host to container when a dlsym comes in. A session associated with a handler is created and destroyed. The stack processing module does the conversion between stack and protocol buffer. The DL interceptor module and the mapping stub module use this function to convert then deliver data to each other. The mapping stub module loads the target shared library to the memory address space by utilizing libld.so, then records the map between session ID and the handler. The data and dlsym request are routed to the target library when a DL function comes in.

Figure 5:
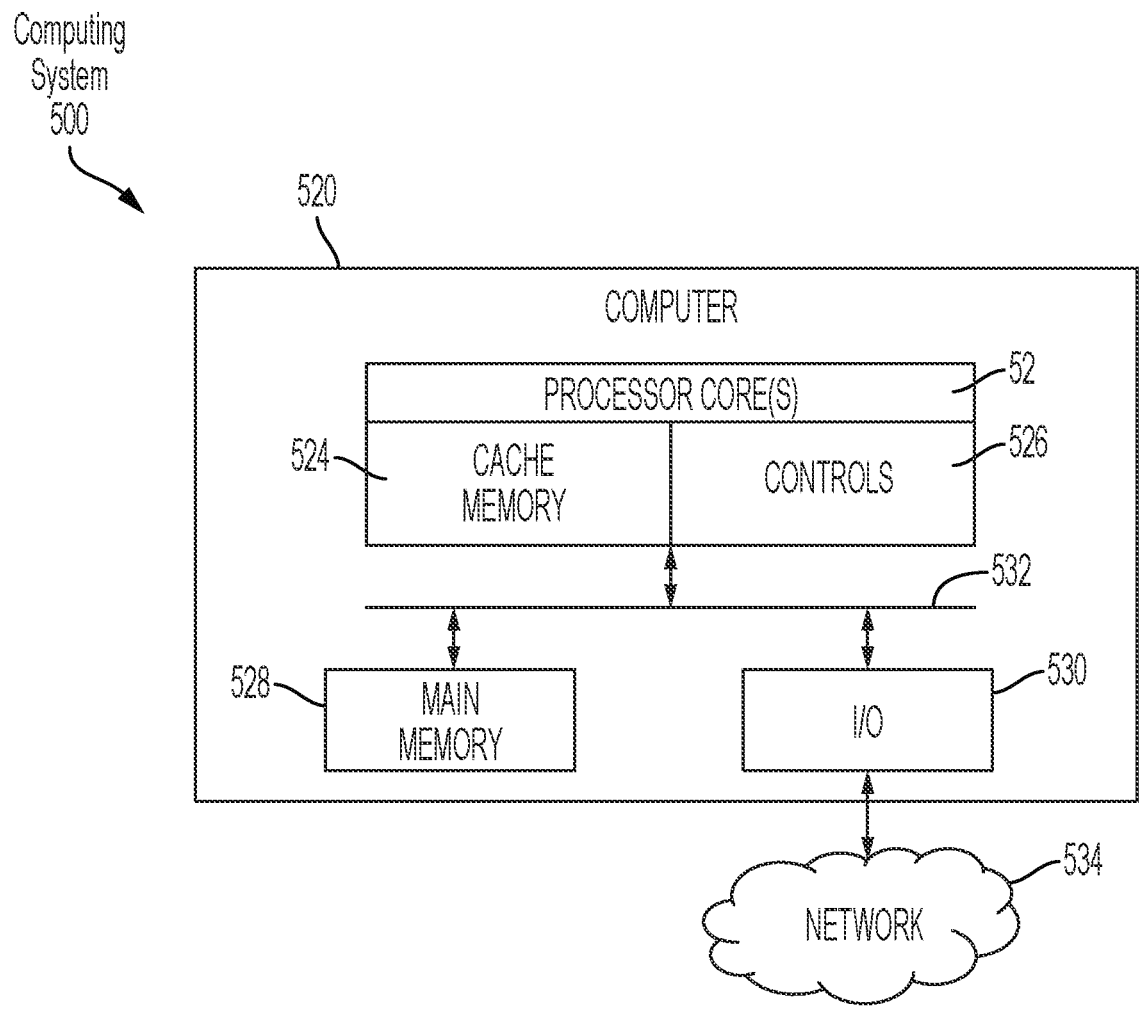
FIG. 5 depicts details of an exemplary computing system capable of implementing aspects of the invention.

FIG. 5 illustrates an example of a computer system 500 that can be used to implement any of the computer-based components of the various embodiments of the invention described herein. The computer system 500 includes an exemplary computing device ("computer") 502 configured for performing various aspects of the content-based semantic monitoring operations described herein in accordance aspects of the invention. In addition to computer 502, exemplary computer system 500 includes network 514, which connects computer 502 to additional systems (not depicted) and can include one or more wide area networks (WANs) and/or local area networks (LANs) such as the Internet, intranet(s), and/or wireless communication network(s). Computer 502 and additional system are in communication via network 514, e.g., to communicate data between them.

Exemplary computer 520 includes processor cores 52, main memory ("memory") 528, and input/output component(s) 530, which are in communication via bus 532. Processor cores 52 includes cache memory ("cache") 524 and controls 526, which include branch prediction structures and associated search, hit, detect and update logic, which will be described in more detail below. Cache 524 can include multiple cache levels (not depicted) that are on or off-chip from processor 52. Memory 528 can include various data stored therein, e.g., instructions, software, routines, etc., which, e.g., can be transferred to/from cache 524 by controls 526 for execution by processor 52. Input/output component(s) 530 can include one or more components that facilitate local and/or remote input/output operations to/from computer 520, such as a display, keyboard, modem, network adapter, etc. (not depicted).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
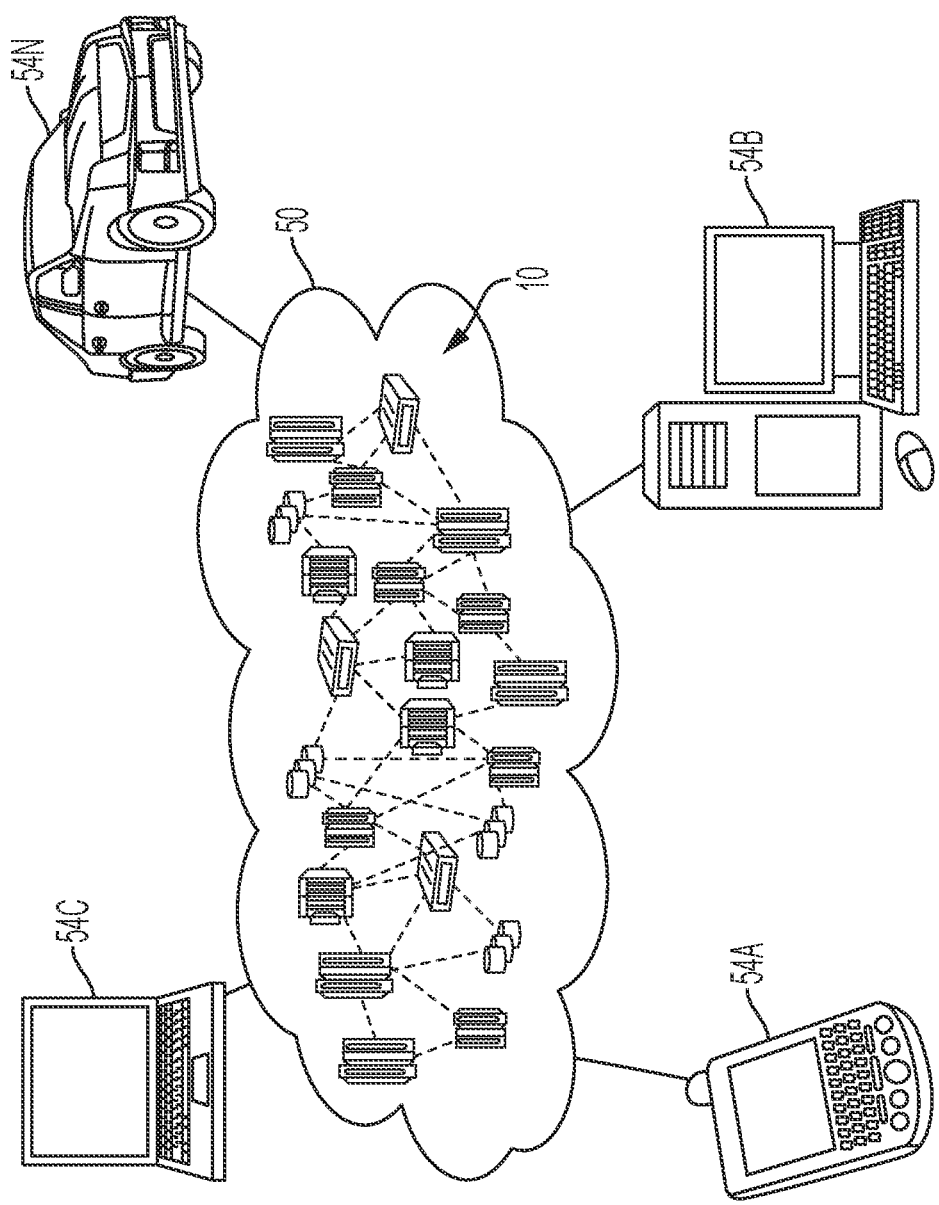
FIG. 6 depicts a cloud computing environment according to embodiments of the invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
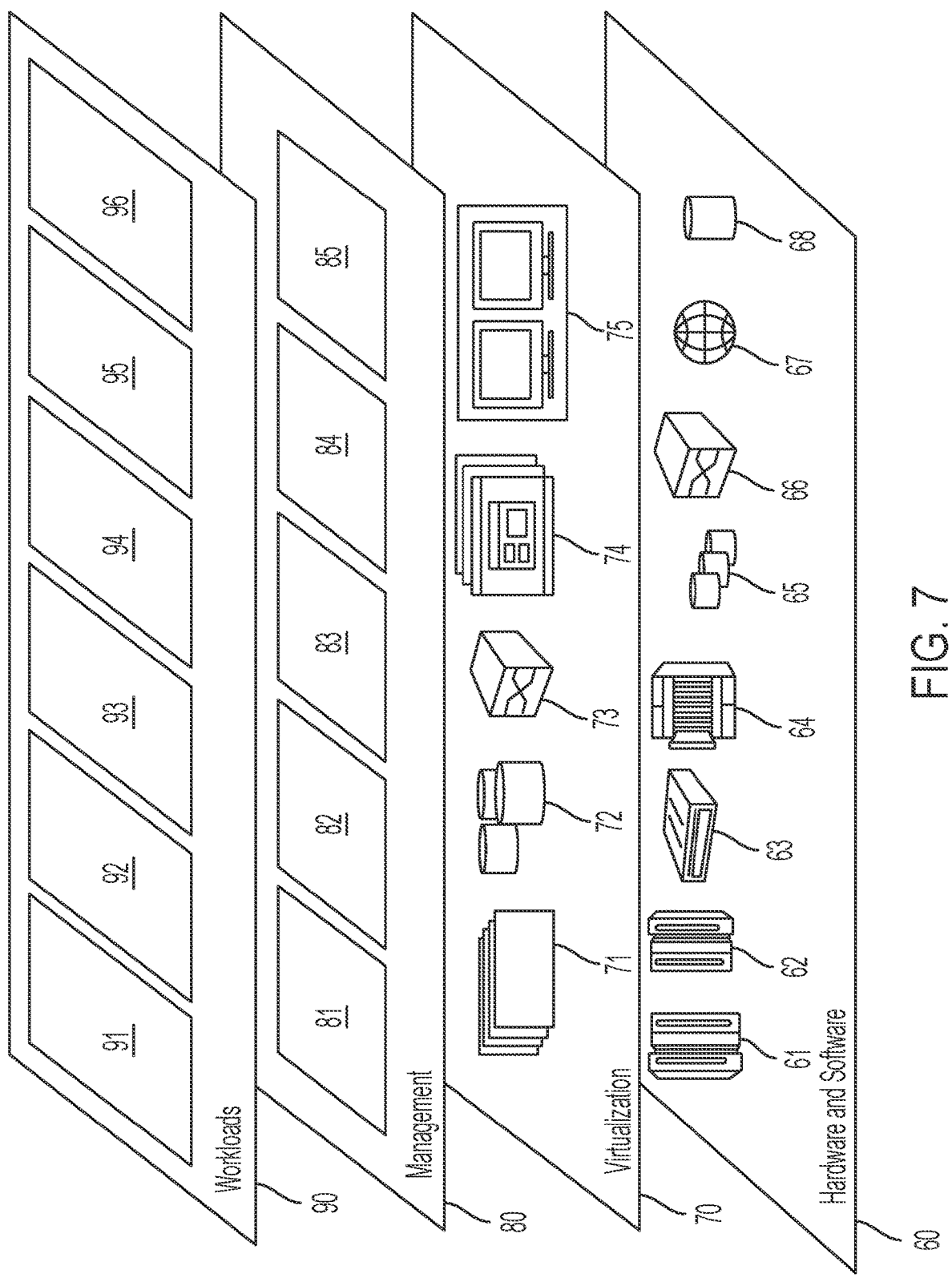
FIG. 7 depicts abstraction model layers according to an embodiment of the invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automatically avoiding segmentation errors by utilizing containers to clean runtime resources when unloading a shared library 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, unless the context clearly indicates otherwise, the singular forms "a", "an" and "the" are intended to include the plural forms. The terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The term "exemplary" is used herein to mean "serving as an example, instance, or illustration." Any embodiment or design described herein as "exemplary" is not necessarily to be construed as preferred or advantageous over other embodiments or designs. The terms "at least one" and "one or more" can include any integer number greater than or equal to one, i.e. one, two, three, four, etc. The terms "a plurality" can include any integer number greater than or equal to two, i.e. two, three, four, five, etc. The term "connection" can include both an indirect "connection" and a direct "connection."

The terms "about," "substantially" and equivalents thereof are intended to include the degree of error associated with measurement of the particular quantity based upon the equipment available at the time of filing the application. For example, "about," "substantially" and equivalents thereof can include a range of ±8% or 5%, or 2% of a given value.

While the present invention has been described in detail in connection with only a limited number of embodiments, it should be readily understood that the present invention is not limited to such disclosed embodiments. Rather, the present invention can be modified to incorporate any number of variations, alterations, substitutions or equivalent arrangements not heretofore described, but which are commensurate with the spirit and scope of the present invention. Additionally, while various embodiments of the present invention have been described, it is to be understood that aspects of the present invention can include only some of the described embodiments. Accordingly, the present invention is not to be seen as limited by the foregoing description but is only limited by the scope of the appended claims.

What is claimed is:

1. A computer-implemented method comprising:
   accessing, using a processor, a loader library;
   using the processor to generate a mock library comprising a mock version of the loader library;
   using the processor to containerize the loader library and store the mock library on a dynamic link (dl) interceptor module; and
   using the processor to unload the loader library;
   wherein the processor comprises:
      a stack processing module communicatively coupled to the dl interceptor module; and
      a mapping stub module communicatively coupled to the stack processing module; and
   wherein the mapping stub module is part of a containerization platform.

2. The computer-implemented method of claim 1 further comprising sending an unload signal to the loader library.

3. The computer-implemented method of claim 1, wherein a dlclose instruction is used to instruct the processor to unload the loader library.

4. A computer system comprising a processor and a memory communicatively coupled to the processor, wherein the processor is configured to perform processor operations comprising:
   accessing a loader library;
   generating a mock library comprising a mock version of the loader library;
   storing the mock library on a dynamic link (dl) interceptor module;
   containerizing the loader library; and
   unloading the loader library;
   wherein the processor comprises:
      a stack processing module communicatively coupled to the dl interceptor module; and
      a mapping stub module communicatively coupled to the stack processing module; and
   wherein the mapping stub module is part of a containerization platform.

5. The computer system of claim 4, wherein the processor operations further comprise sending an unload signal to the loader library.

6. The computer system of claim 4, wherein the processor operations include using a dlclose instruction to instruct the processor to unload the loader library.

7. A computer program product for unloading libraries, the computer program product comprising a computer readable storage medium storing a computer readable program, wherein the computer readable program, when executed on a processor, causes the processor to perform a processor method comprising:
   accessing a loader library;
   generating a mock library comprising a mock version of the loader library;
   storing the mock library on a dynamic link (dl) interceptor module;
   containerizing the loader library; and
   unloading the loader library;

wherein the processor comprises:
a stack processing module communicatively coupled to the dl interceptor module; and
a mapping stub module communicatively coupled to the stack processing module; and
wherein the mapping stub module is part of a containerization platform.

8. The computer program product of claim 7 further comprising sending an unload signal to the loader library.

9. The computer program product of claim 7, wherein a dlclose instruction is used to instruct the processor to unload the loader library.

\* \* \* \* \*